United States Patent [19]

Lessick

[11] Patent Number: 5,533,773
[45] Date of Patent: Jul. 9, 1996

[54] SELF-TENSIONING TAILGATE BARRIER

[76] Inventor: Nicolas P. Lessick, 230 Avenida Cabrillo, San Clemente, Calif. 92672

[21] Appl. No.: 407,164

[22] Filed: Mar. 20, 1995

[51] Int. Cl.⁶ .................................................. B62D 33/033
[52] U.S. Cl. ............................ 296/52; 296/180.1; 296/50
[58] Field of Search ................................. 296/50, 51, 52, 296/152, 180.1, 57, 24.1; 410/129, 142, 117, 104; 160/DIG. 2; 52/83, 222, 676

[56]  References Cited

U.S. PATENT DOCUMENTS

| 276,053 | 4/1883 | Lewis . | |
|---|---|---|---|
| 1,247,778 | 11/1917 | Zorn | 296/52 |
| 2,564,480 | 8/1951 | Jones | 5/94 |
| 2,594,208 | 4/1952 | Pilot | 105/376 |
| 2,695,792 | 11/1954 | Rumsey | 280/150 |
| 3,099,313 | 7/1963 | Peck et al. | 160/243 |
| 3,169,781 | 2/1965 | Abruzzino | 280/150 |
| 3,442,550 | 5/1969 | Esbeck | 296/50 |
| 3,695,629 | 10/1972 | Schlanger | 280/150 AB |
| 3,695,698 | 10/1972 | Trump | 297/390 |
| 3,909,038 | 9/1975 | McDonnell | 280/150 B |
| 4,763,944 | 8/1988 | Fry et al. | 296/50 |
| 4,932,705 | 6/1990 | Miller | 296/50 |
| 5,026,231 | 6/1991 | Moore | 410/118 |
| 5,427,486 | 6/1995 | Green | 410/118 |

FOREIGN PATENT DOCUMENTS

| 1258307 | 2/1960 | France . |
| 120454 | 11/1965 | Germany . |
| 207524 | 7/1924 | United Kingdom . |
| 922872 | 4/1963 | United Kingdom . |
| 1568405 | 5/1977 | United Kingdom . |
| 2156748A | 10/1995 | United Kingdom . |

Primary Examiner—David M. Mitchell
Assistant Examiner—Jonathan J. Yun
Attorney, Agent, or Firm—Stetina Brunda & Buyan

[57]  ABSTRACT

A tailgate barrier to be suspended between the sidewalls of a pickup truck includes a flexible barrier having stiffeners at the side edges. At least two connecting members attach the edge stiffeners to the truck sidewalls, allowing horizontal movement of the barrier. Biasing members attached to the connecting members force the edge stiffeners towards the respective sidewalls. The biasing members are preferably compression springs. The tailgate barrier eliminate out-of-plane sag. The tailgate barrier is also easily installed and removed without being subjected to wear.

16 Claims, 2 Drawing Sheets

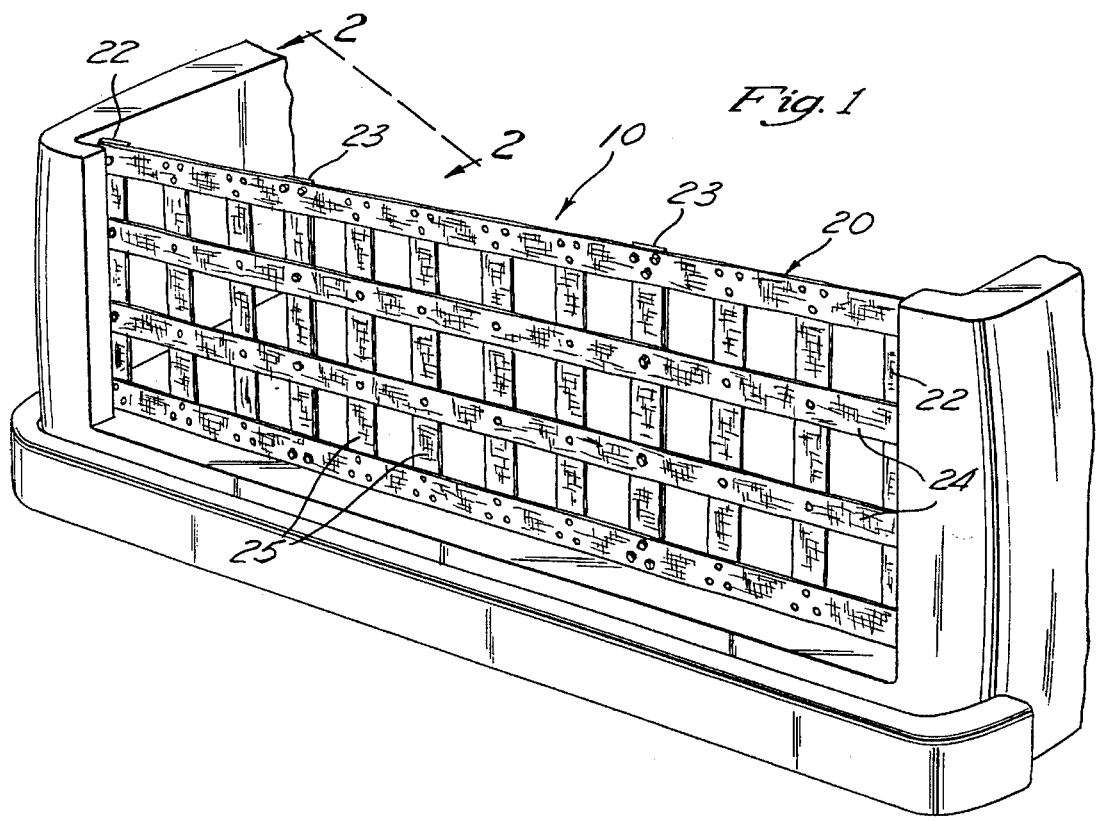
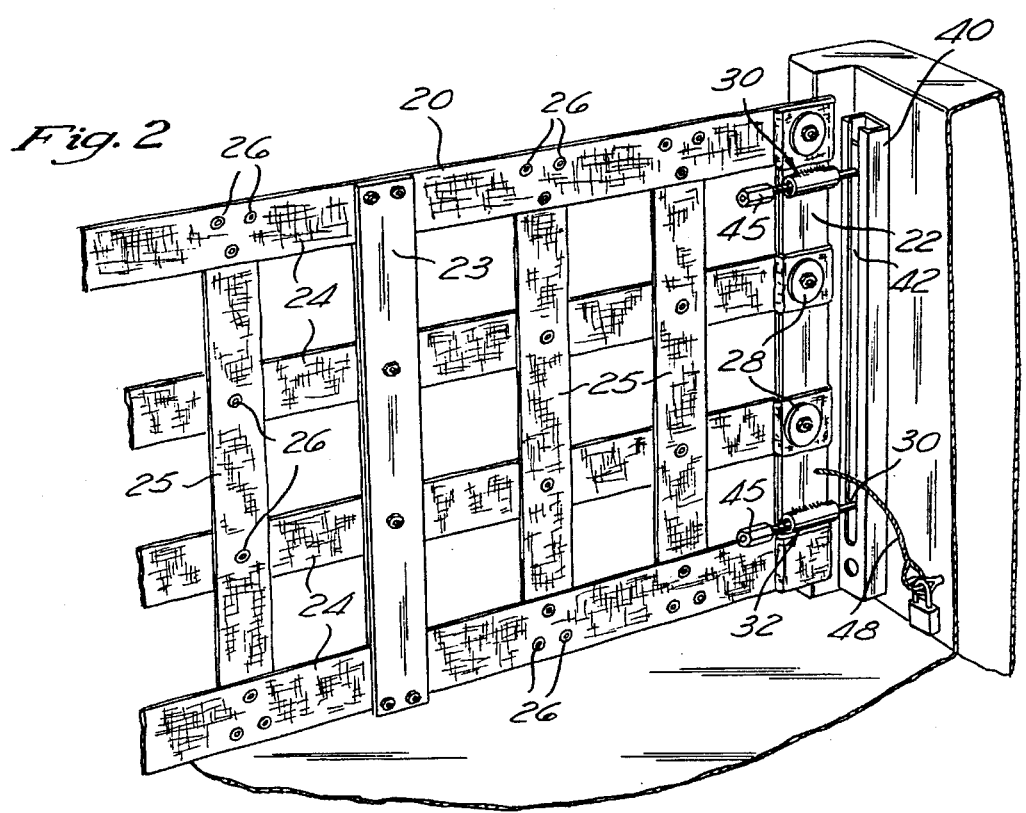

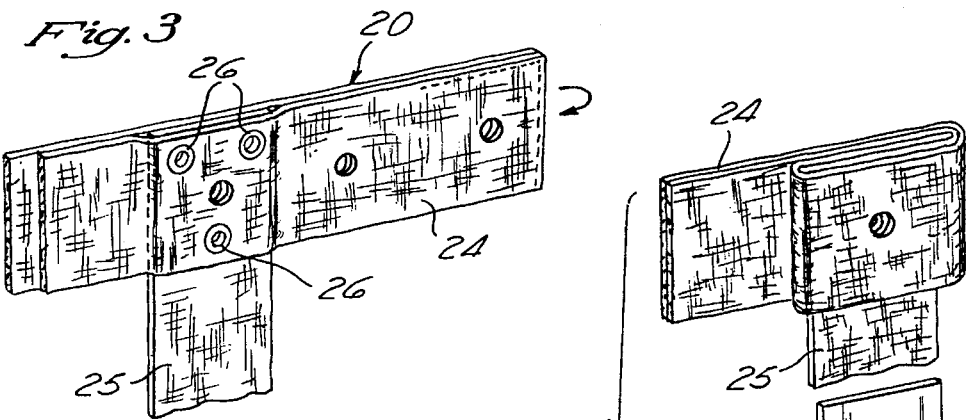
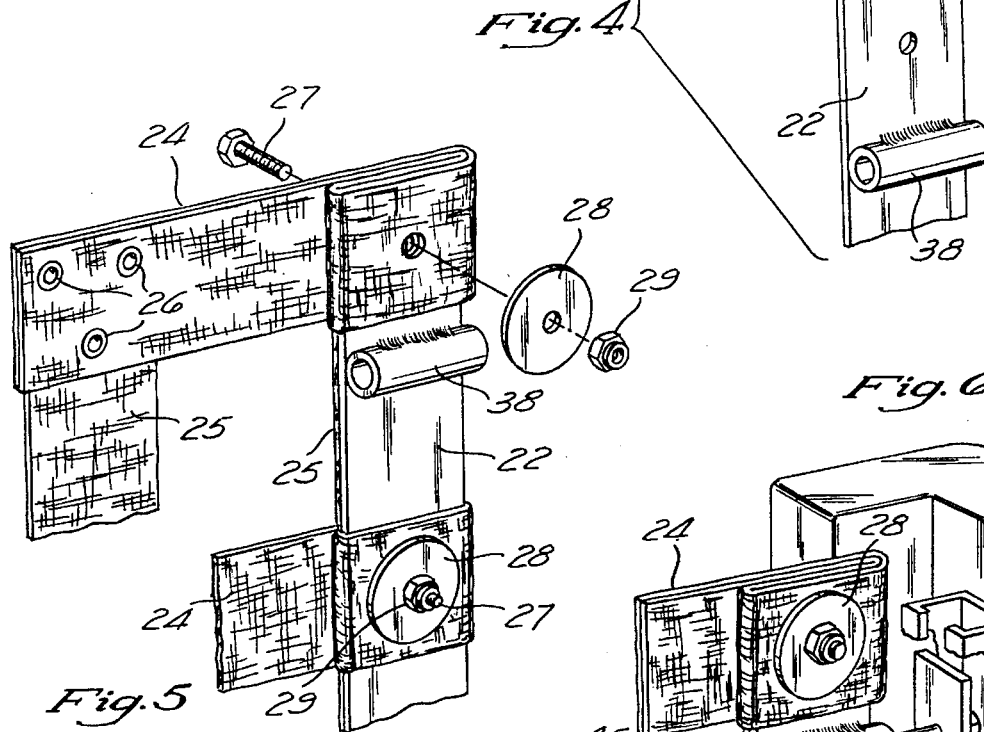
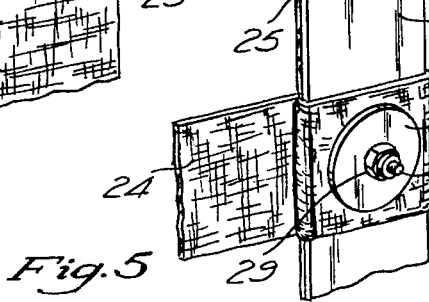
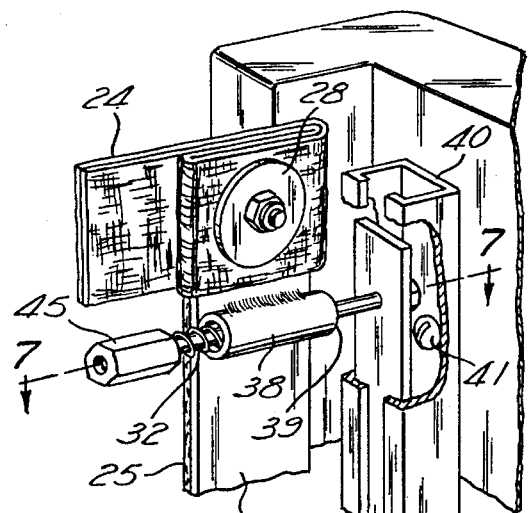
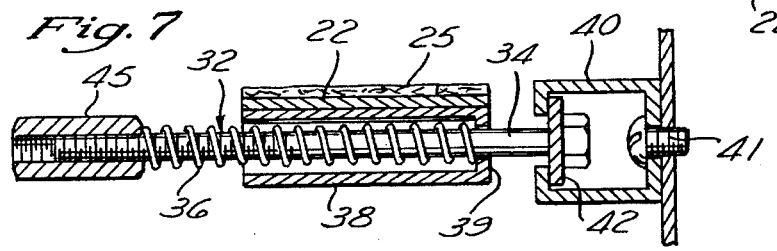

SELF-TENSIONING TAILGATE BARRIER

FIELD OF THE INVENTION

The present invention relates generally to a flexible tailgate barrier for a pickup truck, and more particularly to a tailgate barrier installed in tension between the sidewalls of the bed of a pickup truck.

BACKGROUND OF THE INVENTION

It is well known, especially in smaller trucks, to replace the hinged solid tailgate with a flexible net. The net, like a metal barrier, prevents persons and objects from falling off the rear of the truck bed, and may be removed for loading and unloading operations. In addition however, the flexible net offers the advantages of reducing aerodynamic drag and reducing the vehicle weight.

There are, however, shortcomings in the nets currently available in the marketplace, including poor appearance, noisiness, and accelerated wear. Because the nets are not self-supporting, they typically rely on tension created by elastic inlays or the tensioning of individual horizontal webbing straps to create a flat tailgate shape. The problem is that these methods often produce uneven results, such as sagging of the net outside the plane of the tailgate. There may also be considerable high frequency noise generated by flutter and flapping of the net when the vehicle is in motion.

The prior art has made efforts to overcome the above-mentioned problems, for example, by adding metallic stiffeners around the periphery of the net, and by adding adjustable straps to connect the net corners to the respective truck bed corners. The edge stiffeners are only partially effective in distributing the tension load throughout the net. In addition, removal of the net and subsequent reinstallation of such nets is a tedious process and tends to wear out the adjustable straps. Further, the tensioning of the net must be readjusted each time the net is removed and reinstalled.

SUMMARY OF THE INVENTION

The present invention specifically addresses and alleviates the above-mentioned deficiencies associated with the prior art, namely out-of-plane sagging and fluttering of the net, and the laborious installation process causing accelerated wear of the net. More particularly, the present invention includes a flexible barrier including edge stiffeners at its side edges, the stiffeners operative to distribute loads throughout the barrier. The present invention further includes at least a pair of connecting members which attach the stiffeners to the truck sidewalls, the connecting members permitting horizontal movement of the barrier. Biasing members attached to the connecting members are operative to urge, i.e., bias, the edge stiffeners toward the truck sidewalls. The biasing members are therefor operative to place the barrier under a constant tension load to support the net between the truck sidewalls.

In a preferred embodiment of the invention, the biasing members comprise compression springs attached to the connecting members. Also, a preferred embodiment includes adjusting nuts rotatably attached to the connecting members, operative to vary the biasing force. Once the adjusting nuts are initially set, no further adjustment should be required, though possible. A preferred embodiment further includes a retainer for each of the connecting members, the retainer fixedly attached to the respective edge stiffener, the retainer partially enclosing the connecting member and compression spring. In addition, a preferred embodiment includes slotted tracks attached to the truck sidewalls and a slider bar inside each slotted track, the slider bar attaching to the connecting members on that side. The slotted track and slider bar permit an easy vertical sliding installation and removal of the barrier.

A preferred embodiment of the present invention functions as follows. Initially, the slotted rails are mounted to opposite sides of the truck bed. The barrier is then installed into both sides of the pickup truck, by vertically sliding the slider bars downwardly through the slotted rails. The connecting members and the biasing members (compression springs) are then manually adjusted to operatively hold the barrier in desired tension between the sidewalls. The edge stiffeners, and optional center stiffeners between the edges, evenly distribute the tension load throughout the barrier. The compression springs bear against the retainers which are attached to the stiffeners at the edges of the barrier. Adjusting nuts may be turned to exert an additional force on the compression springs, thereby increasing the biasing force. Once this initial adjustment is made, the tension of the barrier is set and retained. It need not be adjusted each time the barrier is removed and reinstalled as in the prior art. Besides saving time and effort, wear and tear on the tailgate barrier is also minimized. The barrier is easily removable by sliding the slider bars vertically upward out of the slotted tracks.

These as well as other advantages of the present invention will become more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of the self-tensioning tailgate barrier of the present invention installed upon the bed of a pickup truck;

FIG. 2 is an enlarged reverse angle perspective view of one edge of the tailgate barrier illustrating its mounting upon the sidewalls of the pickup truck;

FIG. 3 is an enlarged fragmentary view of the fabric weave construction of the present invention;

FIG. 4 is an enlarged fragmentary view of the edge stiffeners incorporated into opposite ends of the present invention;

FIG. 5 depicts the edge construction of the tailgate barrier of the present invention;

FIG. 6 shows the connecting member and installation of the tailgate barrier to the pickup truck; and FIG. 7 is a section view taken about lines 7—7 of FIG. 6 showing the details of the biasing members and the adjusting members.

DETAILED DESCRIPTION OF THE PREFERRED EMBODIMENT

The detailed discussion set forth below in connection with the appended drawings is intended as a description of the presently preferred embodiment of the invention, and is not intended to represent the only form in which the present invention may be constructed or utilized. The description sets forth the functions and sequences of steps for constructing and operating the invention in connection with the illustrated embodiment. It is to be understood, however, that the same or equivalent functions and sequences may be accomplished by different embodiments that are also intended to be encompassed within the spirit and scope of the invention.

The self-tensioning tailgate barrier 10 of the present invention is illustrated in FIGS. 1–6 which depict a presently preferred embodiment of the invention. Referring more particularly to FIGS. 1 and 2, the tailgate barrier or net 10 of the present invention is comprised of a flexible barrier 20 having a multiplicity of apertures and having edge stiffeners 22 disposed on opposite sides thereof. The tailgate barrier 10 further includes a pair of connecting members 30 disposed on each side of the barrier 20 for movably attaching the barrier 20 to the respective sidewalls of the truck. The movable attachment members preferably allows a vertical sliding movement of the barrier between the truck sidewalls during installation and removal of the barrier from the truck. The tailgate barrier 10 also includes, for each of the connecting members 30, a biasing or tensioning member 32, preferably comprising a compression spring. The biasing member 32 is operative to continuously urge or bias the edge stiffener 22 towards the truck sidewall, placing the barrier 20 under a constant tension load. The constant tension forces support the barrier 20 and eliminate sag and/or fluttering of the barrier 20 out of the plane of the tailgate during use.

Referring now to FIGS. 3–5, the details of the barrier 20 may be described. The barrier 20 is preferably formed of a weave of horizontal straps 24 and vertical straps 25, preferably affixed together where they intersect by rivets 26. In the preferred embodiment, the straps 24 and 26 are fabricated from a nylon webbing material. However, the barrier 20 could alternatively be constructed of a vinyl/fabric membrane material with die cut apertures, with reinforcements in the membrane material as required. Opposite ends of the tailgate barrier 10 are provided with edge stiffeners 22, preferably fabricated of a lightweight yet stiff flat stock material, such as aluminum strips. The barrier 20 may also include one or more center stiffeners 23 (see FIGS. 1 and 2) formed of similar flat stock material disposed midway between the edge stiffeners 22. The center stiffeners 23 may be the same or very similar in configuration to the edge stiffeners 22. As shown in FIG. 3, the outboard ends of the horizontal straps 24 are preferably sized to extend past the edge stiffeners 22 and are preferably folded back one or more times (as shown in FIGS. 4 and 5), so as the outboard edge of the outboard end of the horizontal straps 24 (FIG. 3) is not exposed. Standard hardware such as a bolt 27, a washer 28, and a nut 29 are preferably used to structurally fasten and secure the barrier 20 to the stiffeners 22 and 23.

Referring now to FIGS. 6 and 7, the connecting member 30 is preferably fabricated as a conventional bolt 34 having a head portion, a shank portion, and a threaded portion. The biasing or tensioning member 32 preferably comprises compression spring 36 disposed along the shank and threaded portions of the connecting member 34. Each connecting member 30 and biasing member 32 cooperates with a cylindrically-shaped retainer 38 having an inboard opened end and an outboard end 39. The outboard end 39 has a clearance hole sized to slidingly receive the connecting bolt 34. Each retainer 38 is preferably welded to the edge stiffener 22, or fixedly attached in some other manner.

Mounted to each of the truck sidewalls is a slotted rail 40, preferably formed as an extruded piece of channel. The slotted rail 40 is preferably attached with several mounting screws 41 to the sidewalls of the truck bed. As best shown in FIGS. 6 and 7, the connecting bolts 34 are attached to a slider bar 42 which is sized to be slidingly received through the slot in the slotted rail 40. An adjusting nut 45 is threadingly engaged upon the threaded portion of the connecting bolt 34. A locking cable 48 (FIG. 2) may also be attached to the barrier 20 to prevent theft.

With the structure defined the use of the tailgate barrier 10 of the preferred embodiment of the present invention may be discussed as the conventional heavy solid tailgate (not shown) has been removed from the vehicle. First, each of the slotted rails 40 are mounted to the inside sidewalls of the pickup truck with at least two fasteners 41 (see FIG. 6). Then the self-tensioning tailgate barrier 10 is installed one side at a time by one individual, or both sides installed simultaneously by two individuals. The slider bar 42 is inserted into the open end of the slotted rail 40, and the connecting bolts 34 pass through the slot in the slotted rail 40 as the barrier is moved vertically downward until the lowest of the horizontal straps 24 of the barrier 20 reaches the bed of the truck. The compression springs 36 bear against the outboard end 39 of the housing 38, thereby pushing the edge stiffener 22 towards the slotted rail 40 and inducing a tension load into the horizontal straps 24 of the barrier 20. The edge stiffeners 22 act to evenly distribute the load from the connecting bolts 34 into the horizontal straps 24 with any additional center stiffeners 23 also contributing to evenly distributing the load among the horizontal straps 24. The tension within the barrier 20 may be adjusted by turning the adjustment nut 45, thereby compressing or relieving the pressure on the compression spring 36. Once the tension has been grossly adjusted and set upon initial installation of the barrier 20, no further adjustments (or only fine adjustments) will be required for subsequent reinstallations after removal of the barrier 20. Finally, the locking cable 48 may be secured to the truck sidewall to prevent theft.

It is understood that the self-tensioning tailgate barrier described herein and shown in the drawings represents only a presently preferred embodiment of the invention. Indeed, various modifications and additions may be made to the embodiment without departing from the spirit and scope of the invention. These and other modifications and additions may be obvious to those skilled in the art and may be implemented to adapt the present invention for use in a variety of different applications.

What is claimed is:

1. A tailgate barrier to be suspended between the sidewalls of a pickup truck, the tailgate barrier comprising:

a flexible barrier having a pair of side edges;

an elongate stiffener attached to each of the respective side edges;

at least two connecting members movably attaching each of the stiffeners to the truck sidewalls, the connecting members allowing horizontal movement of the barrier; and a biasing member attached to each connecting member to urge the respective stiffener toward the respective truck sidewall;

further including a pair of tracks attached to the respective truck sidewalls, and wherein the connecting members are slidably attached to the respective vertical tracks, allowing vertical movement of the barrier.

2. A tailgate barrier to be suspended between the sidewalls of a pickup truck, the tailgate barrier comprising:

a flexible barrier having a pair of side edges;

an elongate stiffener attached to each of the respective side edges;

at least two connecting members movably attaching each of the stiffeners to the truck sidewalls, the connecting members allowing horizontal movement of the barrier; and a biasing member attached to each connecting member to urge the respective stiffener toward the respective truck sidewall;

further including an adjusting member attached to each connecting member, to vary the force exerted by the respective biasing member; and wherein the biasing member is a compression spring, and wherein the adjusting member is a nut rotatably attached to the connecting member, upon rotating the nut the force on the edge stiffener towards the respective track is varied.

3. The tailgate barrier of claim 1, wherein the biasing member is a spring.

4. The tailgate barrier of claim 3, wherein the spring is a compression spring.

5. The tailgate barrier of claim 1, wherein the tracks are slotted rails sized to slidably receive the respective connecting members.

6. The tailgate barrier of claim 5, further including a pair of elongate slider bars attached to the at least two connecting members, the slider bars sized to be slidably received within the respective rail.

7. The tailgate barrier of claim 1, wherein the flexible barrier is substantially inelastic.

8. The tailgate barrier of claim 1, wherein the flexible barrier has horizontal and vertical webbing straps tied together.

9. The tailgate barrier of claim 8, wherein the straps are tied together by rivets.

10. The tailgate barrier of claim 1, wherein the flexible barrier is die cut fabric.

11. The tailgate barrier of claim 8, further including at least one additional elongate stiffener attached to the webbing straps between the side edges.

12. The tailgate barrier of claim 1, further including a retainer for each connecting member, fixedly attached to the respective stiffener, the compression spring bears against the retainer to force the edge stiffener towards the respective track.

13. The tailgate barrier of claim 1, further including a retainer that encloses the biasing member.

14. The tailgate barrier of claim 1, further including a lock member that attaches at least one of the stiffeners to the respective sidewall.

15. The tailgate barrier of claim 8, wherein the horizontal webbing straps have a pair of ends folded back away from the side edges of the barrier.

16. The tailgate barrier of claim 15, wherein the ends are twice folded back.

* * * * *